P. D. CUMMINGS.
CHAIN.
No. 28,630. Patented June 5, 1860.
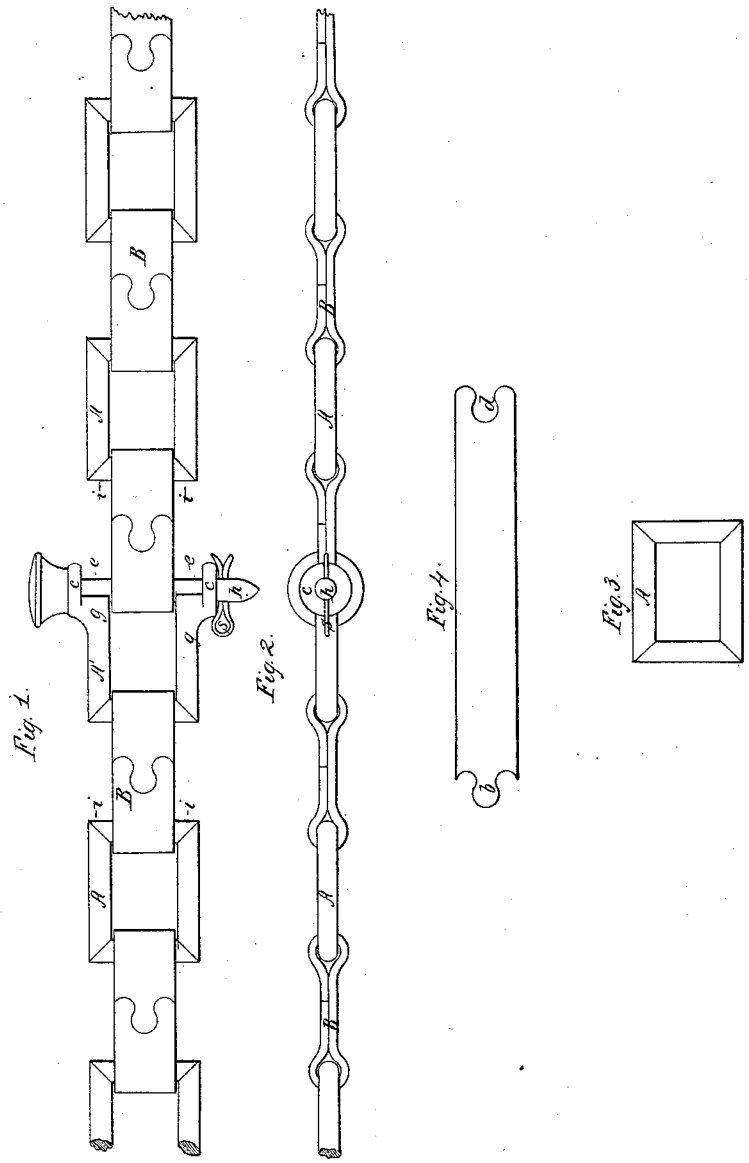

UNITED STATES PATENT OFFICE.

PERLEY D. CUMMINGS, OF PORTLAND, MAINE, ASSIGNOR TO D. H. FURBISH, OF SAME PLACE.

CHAIN.

Specification of Letters Patent No. 28,630, dated June 5, 1860.

*To all whom it may concern:*

Be it known that I, PERLEY D. CUMMINGS, of Portland, in the county of Cumberland and State of Maine, have invented certain new and useful Improvements in Chains; and I do hereby declare that the following is a full, clear, and exact description of the same, reference being had to the accompanying drawings, in which—

Figure 1 represents a side view of a chain for driving machinery constructed according to the principles of my invention; Fig. 2 is an edge view of the same; Fig. 3 a view of one of the links detached, and Fig. 4 is a view of one of the straps before it is bent.

The objects of my invention are to produce a cheap and substantial flat chain composed of alternate square links and straps suitable particularly to be used in imparting motion from one sprocket wheel to another, and also to obtain a ready and efficient means of coupling the ends of the chain together which will not interfere with the operation of the teeth or lugs of the sprocket wheels to which the chain is applied.

The first part of my invention has reference to the first object, and it consists in a chain link strap one of whose ends has a head formed upon it while the other end has a socket cut in it corresponding with the head, so that the ends of the strap can be secured together in the process of applying the strap to the links by forcing the head into the socket.

The second part of my invention has reference to the second object, and consists in an open coupling link having a pair of ears for the insertion of the coupling pin that are located outside of the range of the teeth or lugs of the sprocket wheel to which the chain is applied, so that the lugs of the sprocket wheel can bear directly against the coupling pin in the same manner that they do against the cross bars of the closed links.

A chain constructed according to the principles of my invention is made of a series of square links A, A', and straps B. The links are best made in one piece without a joint, either by forging them of wrought iron or by casting them of malleable iron. The straps are easiest made by cutting them from a straight flat strip of metal into the form shown at Fig. 4, one end having a head $b$, and the other end having a corresponding socket $d$ which corresponds in size and position with the head at the other end of the strap. The straps are then partially bent either by hand or by machinery, after which the links are applied to them and the opposite sides of the bent strap are pressed into contact. In this closing of the strap the head $b$ enters into the socket, and as the head is larger than the neck which connects it with the remainder of the strap while the lugs of the socket are larger than their necks, the head cannot be pulled endwise out of the socket and a firm connection is obtained without the assistance of rivets or other means of connection. The head and socket thus described have a curvilinear outline, and this I deem the best; but the particular form of outline of the head and socket are not material so long as the head and socket are so formed that when put together sidewise they can not be pulled apart endwise.

The open link A' of the chain is formed with two ears $c\ c$ which are bracketed off sidewise from the legs $g\ g$, of the link so as to be out of the range of the lugs of the sprocket wheel to which the chain is to be applied. These lugs are traversed by the coupling pin $h$ whose side at the parts $e\ e$, being uncovered by the ears of the link, presents the same form to the lugs of the sprocket wheel as the corresponding parts $i\ i$ of any other one of the square links. Hence the coupling link of the chain does not interfere with the proper operation of the lugs or teeth of the sprocket wheel to which the chain is applied. The coupling pin $h$ has a head at one end and is fitted with a spring lug $s$ at the other, as is customary to hold it in place.

What I claim as my invention and desire to secure by Letters Patent, is—

1. A chain link strap one of whose ends has a head formed on it while the other end has a socket to receive the head substantially as described.

2. An open coupling link for chains with ears located at the outer sides of the legs of the link as described.

In testimony whereof I have hereunto subscribed my name.

PERLEY D. CUMMINGS.

Witnesses:
 CHAS. W. CAHOON,
 CLINTON FURBISH.